US012380361B2

(12) United States Patent
Chhibber et al.

(10) Patent No.: US 12,380,361 B2
(45) Date of Patent: Aug. 5, 2025

(54) FEDERATED MACHINE LEARNING MANAGEMENT

(71) Applicant: PayPal, Inc., San Jose, CA (US)

(72) Inventors: Abhishek Chhibber, Sunnyvale, CA (US); Darshankumar Bhadrasinh Desai, Fremont, CA (US); Michael Charles Todasco, Santa Clara, CA (US); Vidyut Mukund Naware, Fremont, CA (US); Nitin S. Sharma, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 944 days.

(21) Appl. No.: 17/357,626

(22) Filed: Jun. 24, 2021

(65) Prior Publication Data

US 2022/0414529 A1 Dec. 29, 2022

(51) Int. Cl.
*G06N 20/00* (2019.01)
*G06F 16/23* (2019.01)
(Continued)

(52) U.S. Cl.
CPC .......... *G06N 20/00* (2019.01); *G06F 16/2379* (2019.01); *G06N 3/098* (2023.01); *H04L 67/01* (2022.05)

(58) Field of Classification Search
CPC ....... H04L 67/02; H04L 67/025; H04L 67/04; H04L 67/06; H04L 67/08; H04L 67/10;
(Continued)

(56) References Cited

U.S. PATENT DOCUMENTS 8,589,398 B2    11/2013    Sundaresan et al.
9,275,340 B2    3/2016    Patil et al.
(Continued)

FOREIGN PATENT DOCUMENTS

WO    WO-2020168761 A1 *   8/2020    .......... G06F 18/214
WO    WO-2020229684 A1 *   11/2020    ............. G06N 3/045

OTHER PUBLICATIONS

Dianlei Xu et al: "A Survey on Edge Intelligence", arxiv.org, Cornell University Library, 201 Olin Library Cornell University Ithaca, NY 14853, Mar. 26, 2020 (Mar. 26, 2020), XP081630635 (Year: 2020).*

(Continued)

*Primary Examiner* — Ashish Thomas
*Assistant Examiner* — Jasmine Thanh Thai
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed in which a computer system receives, from a plurality of user computing devices, a plurality of device-trained models and obfuscated sets of user data stored at the plurality of user computing devices, where the device-trained models are trained at respective ones of the plurality of user computing devices using respective sets of user data prior to obfuscation. In some embodiments, the server computer system determines similarity scores for the plurality of device-trained models, wherein the similarity scores are determined based on a performance of the device-trained models. In some embodiments, the server computer system identifies, based on the similarity scores, at least one of the plurality of device-trained models as a low-performance model. In some embodiments, the server computer system transmits, to the
(Continued)

user computing device corresponding to the low-performance model, an updated model.

20 Claims, 7 Drawing Sheets

(51) Int. Cl.
  *G06N 3/098* (2023.01)
  *H04L 67/01* (2022.01)
(58) Field of Classification Search
  CPC ............ H04L 67/1001; H04L 67/1004; H04L 67/1006; H04L 67/1008; H04L 67/101; H04L 67/1012; H04L 67/1014; H04L 67/1017; H04L 67/1019; H04L 67/1021; H04L 67/1023; H04L 67/1025; H04L 67/1027; H04L 67/1029; H04L 67/1031; H04L 67/1034; H04L 67/1036; H04L 67/1038; H04L 67/104; H04L 67/1042; H04L 67/1044; H04L 67/1046; H04L 67/1048; H04L 67/1051; H04L 67/1053; H04L 67/1055; H04L 67/1057; H04L 67/1059; H04L 67/1061; H04L 67/1063; H04L 67/1065; H04L 67/1068; H04L 67/107; H04L 67/1072; H04L 67/1074; H04L 67/1076; H04L 67/1078; H04L 67/108; H04L 67/1082; H04L 67/1085; H04L 67/1087; H04L 67/1089; H04L 67/1091; H04L 67/1093; H04L 67/1095; H04L 67/1097; H04L 67/12; H04L 67/125; H04L 67/131; H04L 67/133; H04L 67/1396; H04L 67/2866; H04L 67/2869; H04L 67/2871; H04L 67/2876; H04L 67/288; H04L 67/2885; H04L 67/289; H04L 67/2895; H04L 67/30; H04L 67/303; H04L 63/0421; H04L 63/1416; H04L 67/306; H04L 67/535; H04L 9/40; H04L 63/00; H04L 67/01; G06N 20/00; G06N 5/045; G06F 16/2379; G06F 21/554; G06F 21/6245; G06F 21/6254; G06Q 10/0635; G06Q 20/4016; G06Q 30/018; G06Q 30/0225; G06Q 30/0248; G06Q 30/0609; G06Q 40/02; G06Q 30/0255; G06Q 30/0615
  See application file for complete search history.

(56) References Cited

U.S. PATENT DOCUMENTS

| | | | |
|---|---|---|---|
| 10,127,403 B2* | 11/2018 | Kong | ................... H04L 63/102 |
| 10,607,226 B2* | 3/2020 | Patel | ................... G06Q 20/322 |
| 11,023,593 B2 | 6/2021 | Lee et al. | |
| 11,188,791 B2* | 11/2021 | Choudhury | ....... G06F 18/23213 |
| 11,200,494 B1* | 12/2021 | Kim | ....................... G06N 3/045 |
| 11,461,690 B2* | 10/2022 | Szeto | .................... G06N 20/10 |
| 11,487,969 B2* | 11/2022 | Huth | ...................... G06F 18/28 |
| 2007/0297590 A1* | 12/2007 | Macbeth | ................ G06Q 10/00 |
| | | | 379/201.02 |
| 2011/0066551 A1 | 3/2011 | Bruesewitz et al. | |
| 2011/0178943 A1* | 7/2011 | Motahari | ............ H04L 63/0407 |
| | | | 705/325 |
| 2013/0132330 A1* | 5/2013 | Hurwitz | ................ G06F 21/604 |
| | | | 706/52 |
| 2015/0186383 A1 | 7/2015 | Pinckney et al. | |
| 2016/0132787 A1* | 5/2016 | Drevo | .................... G06N 20/10 |
| | | | 706/12 |
| 2017/0308960 A1* | 10/2017 | Mascaro | .............. G06Q 40/123 |
| 2018/0018590 A1 | 1/2018 | Szeto et al. | |
| 2019/0014142 A1* | 1/2019 | Madhu | ................ H04L 63/1408 |
| 2019/0036716 A1* | 1/2019 | Kasaragod | ............ H04L 63/104 |
| 2019/0164014 A1* | 5/2019 | Tanaka | .................... G06N 20/00 |
| 2019/0227980 A1* | 7/2019 | McMahan | ............. G06N 3/044 |
| 2019/0318240 A1* | 10/2019 | Kulkarni | .................. G06N 3/08 |
| 2019/0325346 A1* | 10/2019 | Okanohara | ............ G06N 20/00 |
| 2019/0392441 A1* | 12/2019 | Lee | ........................ G06N 20/00 |
| 2019/0392450 A1 | 12/2019 | Gosset et al. | |
| 2020/0007542 A1* | 1/2020 | Maierean | ............... H04L 9/3297 |
| 2020/0082259 A1 | 3/2020 | Gu et al. | |
| 2020/0244674 A1* | 7/2020 | Arzani | .................... G06N 20/00 |
| 2020/0285980 A1* | 9/2020 | Sharad | .................... G06N 20/20 |
| 2020/0358599 A1* | 11/2020 | Baracaldo Angel | ........................ |
| | | | G06F 21/6227 |
| 2021/0019657 A1 | 1/2021 | Wu et al. | |
| 2021/0027111 A1 | 1/2021 | Taralova | |
| 2021/0042630 A1 | 2/2021 | Roberts et al. | |
| 2021/0150269 A1* | 5/2021 | Choudhury | ........ G06V 30/1985 |
| 2021/0174347 A1 | 6/2021 | Rose | |
| 2021/0234848 A1 | 7/2021 | Harris et al. | |
| 2022/0122087 A1 | 4/2022 | Gosset et al. | |
| 2022/0269927 A1 | 8/2022 | Rice et al. | |
| 2022/0414661 A1 | 12/2022 | Hassanzadeh et al. | |
| 2023/0025754 A1 | 1/2023 | Hassanzadeh et al. | |
| 2023/0289604 A1 | 9/2023 | Chan et al. | |
| 2024/0104570 A1 | 3/2024 | Fu | |

OTHER PUBLICATIONS

International Preliminary Report on Patentability for Application No. PCT/US2022/073085 mailed on Jan. 4, 2024, 5 pages.
International Search Report and Written Opinion in PCT Appl. No. PCT/US2022/073085 mailed Sep. 6, 2022, 7 pages.
Qiang Yang., et al., "Federated Learning," Federated Learning, Ieee, Us, Jan. 1, 2019, pp. 189, XP009535889, Retrieved from the Internet: URL: https://ieeexplore.ieee.org/abstract/d%20ocument/8940936.
Extended European Search Report in Appl. No. 22829497.1 mailed Nov. 18, 2024, 9 pages.
Dianlei Xu et al., "A Survey on Edge Intelligence," arXiv:2003.12172v1 [cs.NI] Mar. 26, 2020, pp. 16-29.
Notice of Acceptance in Australian Appl. No. 2022299545 mailed Feb. 4, 2025, 3 pages.

* cited by examiner

Method 500

Repeatedly train, using a stream of user data received at the computing device, a baseline model to generate a device-trained model, where the baseline model is trained at the computing device without providing user data included in the stream to a server computer system.
510

Input, to the device-trained model, a set of characteristics associated with a user request received from a user of the computing device, where the device-trained model outputs a score for the user request.
520

Transmit, to the server computer system, the score for the user request, where the transmitting includes requesting a decision for the user request.
530

In response to receiving a decision for the user request from the server computer system, perform an action associated with the user request.
540

Fig. 5

Method
600

```
┌─────────────────────────────────────────────────────────────────────┐
│ Receive, from a plurality of user computing devices, a plurality of │
│ device-trained models and obfuscated sets of user data stored at    │
│ the plurality of user computing devices, where the device-trained   │
│ models are trained at respective ones of the plurality of user      │
│ computing devices using respective sets of user data prior to       │
│ obfuscation.                                                        │
│ 610                                                                 │
└─────────────────────────────────────────────────────────────────────┘
                                   │
                                   ▼
┌─────────────────────────────────────────────────────────────────────┐
│ Determine similarity scores for the plurality of device-trained     │
│ models, where the similarity scores are determined based on a       │
│ performance of the device-trained models.                           │
│ 620                                                                 │
└─────────────────────────────────────────────────────────────────────┘
                                   │
                                   ▼
┌─────────────────────────────────────────────────────────────────────┐
│ Identify, based on the similarity scores, at least one of the       │
│ plurality of device-trained models as a low-performance model.      │
│ 630                                                                 │
└─────────────────────────────────────────────────────────────────────┘
                                   │
                                   ▼
┌─────────────────────────────────────────────────────────────────────┐
│ Transmit, to the user computing device corresponding to the         │
│ low-performance model, an updated model.                            │
│ 640                                                                 │
└─────────────────────────────────────────────────────────────────────┘
```

Fig. 6

FEDERATED MACHINE LEARNING MANAGEMENT

BACKGROUND

Technical Field

This disclosure relates generally to data security, and, more specifically, to techniques for automatically detecting anomalous user behavior e.g., for user account security.

Description of the Related Art

As more and more transactions are conducted electronically via online transaction processing systems, for example, these processing systems become more robust in detecting suspicious and/or unusual behavior associated with user accounts used to conduct such transactions as well as the transactions themselves. As the volume of online transactions increases, the scale for loss (e.g., financial) increases. In addition, entities participating in such transactions may lose trust in the systems processing the transactions if fraudulent transactions are allowed to proceed, causing these systems to incur further loss. Many transaction systems attempt to detect anomalies in transactions in order to prevent such loss.

BRIEF DESCRIPTION OF THE DRAWINGS

FIG. 5 is a flow diagram illustrating a method for training a machine learning model at a user computing device without providing user data to a server computer system, according to some embodiments.

FIG. 6 is a flow diagram illustrating a method for managing models trained at user computing devices, according to some embodiments.

DETAILED DESCRIPTION

Figure 1:
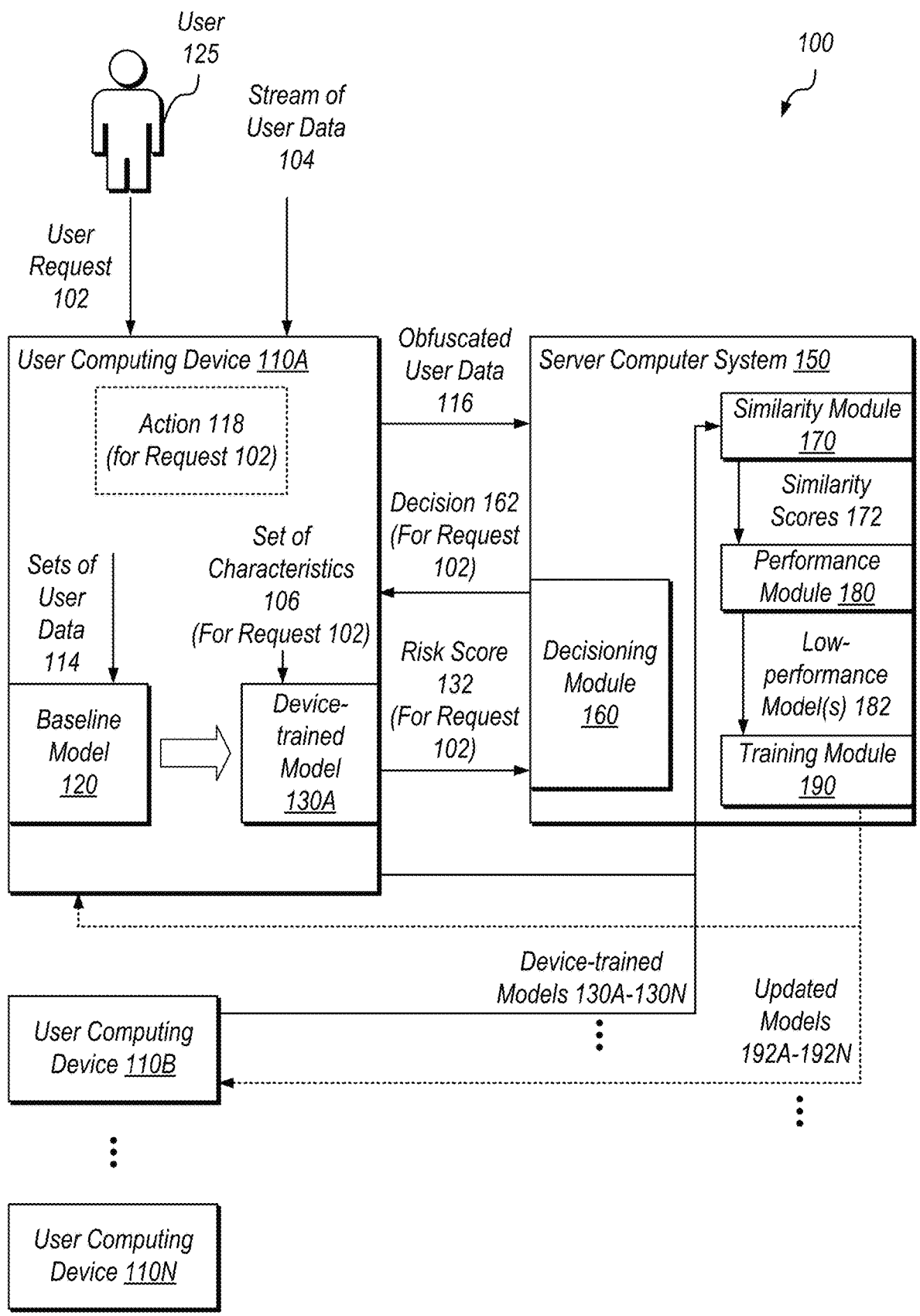
FIG. 1 is a block diagram illustrating hybrid anomaly detection system, according to some embodiments.

Transaction processing systems often perform risk analysis for various different scenarios based on user interaction with the processing systems including transactions initiated by users, login attempts of users, access requests of users (e.g., for secure data), etc. As one specific example, transaction processing systems are generally configured to identify unusual characteristics associated with the millions of transactions they process daily. These risk analyses often include implementation of various anomaly detection methods. Generally, such anomaly detection methods are performed using a machine learning model trained at a server of the transaction processing system. In such situations, however, user device data must be transmitted from user devices to the server in order to be used in training the machine learning model at the server. Due to an increase in privacy measures implemented by different operating systems (e.g., iOS and ANDROID) or different browsers (e.g., SAFARI, CHROME, FIREFOX, etc.), or both on user devices, particularly with respect to private user data, transmission of user device data may be prohibited.

The disclosed techniques implement a hybrid approach to training a machine learning models for anomaly detection. For example, the disclosed techniques perform all or a portion of model training on edge devices rather than performing training at a central system. Performance of such training at edge devices instead of on a central server may be referred to herein as "federated learning." In particular, the portion of machine learning model training that involves private user data is performed at user devices such that the private data does not leave the edge device at which the training is being performed. As such, the disclosed techniques may advantageously improve transaction security while maintaining the integrity of private user information stored at edge devices. As one specific example implementation, performance of machine learning at edge devices (e.g., user's mobile devices) may be implemented due to the 5G technology included in these edge devices. Performance of various tasks, that were previously performed at a server, at individual user computing devices may be referred to in some contexts as mobile edge computing (MEC). Implementation of the disclosed techniques at edge devices is now possible at varying low, mid, and high frequency bands extending through 5G and beyond. As another example implementation, the disclosed machine learning at edge devices may be performed using any of various network communication methods implemented over the air, including communications conducted at varying frequencies (e.g., cellular-based, Wi-Fi-based, satellite-based, etc.). Implementation of the disclosed machine learning techniques using various network communication methods may advantageously provide for lower latency and higher throughput at the user computing devices performing the machine learning while maintaining or increasing the amount of fraud prevention provided. As one specific example, the use of 5G technology may advantageously allow user computing devices to upload device-trained models to the server computer system more quickly and reliably than when using other network communication methods.

Further in disclosed techniques, machine learning models trained at edge devices may be transmitted to a central server of a transaction processing system for fine-tuning. In addition to transmitting device-trained models, edge devices may transmit private user data that has been obfuscated to the central server for use in fine-tuning the device-trained models. Once these models are tweaked at the server using the obfuscated user data, they are transmitted back to individual user devices for further use and training using private user data. In addition to performing aggregation and distribution of user-device trained models, the server provides decisioning to various edge devices by evaluating scores generated by device-trained models at the edge devices. The server performed such evaluation according to various predetermined rules and heuristics and provides user devices with results of the evaluation.

In one example anomaly detection scenario, a transaction processing system may require a user to enter their username and password each time they attempt to log in to their account prior to initiating transactions. This process, however, becomes tedious for many users and can result in high amounts of friction within the user experience, which in turn often results in low user-engagement and end-to-end conversion. For example, if a user attempts to access their account with a transaction processing system three different times to initiate three different transactions within a given day, this user may become frustrated if they have to enter their username and password each time they submit a transaction request, which may cause them to abandon their plans to initiate the second and third transaction, for example. This often results in loss for the transaction processing system or its clients, or both. The disclosed techniques perform risk analysis prior to requesting that a user input their username and password in order to provide a "silent authentication" for this user and, ultimately, effortless access to their account. This may advantageously improve user experience, which in turn increases user engagement and end-to-end conversion for transactions. Note that in various other embodiments, the disclosed techniques may be used to evaluate any of various types of user requests other than account access request, such as electronic transactions.

Hybrid Anomaly Detection

FIG. 1 is a block diagram illustrating hybrid anomaly detection system 100. In the illustrated embodiment, system 100 includes user computing devices 110A-110N and server computer system 150. Note that the interactions discussed with reference to FIG. 1 between user computing device 110A and server computer system 150 might also occur between user computing devices 110B-110N and server computer system 150.

User computing device 110A, in the illustrated embodiment, includes baseline model 120 and device-trained model 130A. In the illustrated embodiment, user computing device 110A receives a user request 102 from a user 125. In some embodiments, user request 102 is a transaction authorization request. In other embodiments, user request 102 is a request to access a user account. For example, a user may open a transaction processing application on their device. In this example, the user opening the application on their device may be the user request. In contrast, in this example, the user inputting their account credentials may be the user request.

User computing device 110A, in the illustrated embodiment, receives a stream 104 of user data. The stream 104 of user data is a continuous flow of information into the user computing device 110A. This stream of data may be continuous and includes device characteristics, characteristics associated with user 125, characteristics associated with user request 102, etc. For example, stream 104 includes one or more of the following characteristics associated with user computing device 110A: location, internet protocol (IP) address, gyroscope data, hardware specifications (device ID, type of device, etc.), software specifications (browser ID, browser type, etc.), mouse/finger movements on a user interface, etc. For example, if a user swipes on their device screen or moves (a change in their geographic location) during initiation of the transaction, this information will be included in the stream 104 of user data. The stream 104 of user data may also include one or more of the following user characteristics: phone number, account name, password, payment information, physical address, mailing address, typing speed, email address, login history, transaction history, etc. In some embodiments, user characteristics are received by user computing device 110A from server computer system 150. For example, the phone number, transaction history, login history, etc. may be received by device 110A from system 150. The stream 104 of user data also includes characteristics associated with user request 102, such as transaction information (dollar amount, time of transaction, location, etc.), account credentials, authentication factors, voice commands, etc.

In some embodiments, user computing device 110A obfuscates user data using one or more privacy techniques. For example, the obfuscation performed by device 110A alters the user data in such a way that other computer systems receiving the obfuscated user data are unable to identify private information included in the user data (e.g., a user's credit card information, home address, passwords, etc.). Privacy techniques are discussed in further detail below with reference to FIG. 2. User computing device 110A, in the illustrated embodiment, transmits obfuscated user data 116 to server computer system 150. In some embodiments, user computing device 110A obfuscates a portion of the user data included in stream 104 and transmits it to system 150. For example, user computing device 110A may send only a portion of the data included in the stream 104 to system 150, but obfuscates this data prior to transmission. As one specific example, if user computing device 110A is an ANDROID device, the stream 104 of user data will include a greater amount of data than if device 110A is an iOS device due to the application security measures set in place for these two different types of devices. In some embodiments, user computing device 110A sends raw user data, that has not been obfuscated, to server computer system 150. For example, if the stream 104 of user data includes information that is public knowledge (e.g., the name of the user), this information might be sent directly to server computer system 150 without obfuscation. In some embodiments, user computing device 110A sends user data that has been transformed (e.g., has been pre-processed in some way), is in vector form, etc.

User computing device 110A trains a baseline model 120 using one or more sets 114 of user data from the stream 104 of user data to generate device-trained model 130A. User computing device 110A trains baseline model 120 using one or more machine learning techniques. Various models discussed herein such as the baseline model 120, the device-trained models 130, and the updated models 192 are machine learning models, including but not limited to one or more of the following types of machine learning models: linear regression, logistic regression, decision trees, Naïve Bayes, k-means, k-nearest neighbor, random forest, gradient boosting algorithms, deep learning, etc.

After generating device-trained model 130A, user computing device 110A inputs set 106 of characteristics associated with user request 102 into model 130A. The set 106 of characteristics may include any of various user data included in stream 104. For example, the set 106 may include information associated a transaction request submitted by user 125 (e.g., transaction amount, type of transaction, device location, IP address, user account, etc.) or may include information associated with an account login request received from user 125 (e.g., username and password, device location, IP address, etc.). Device-trained model 130A outputs risk score 132 for the user request 102 based on set 106 of characteristics and user computing device 110A transmits the risk score 132 to decisioning module 160. Risk score 132 indicates an amount of risk associated with user request 102 based on the set 106 of characteristics. For example, risk score may be a classification score on a scale of 0 (e.g., not suspicious) to 1 (e.g., suspicious). As one specific example, a risk score of 0.8 output by device-trained model 130A may indicate that a transaction indicated in user request 102 is suspicious.

In response to sending risk score 132 to system 150, user computing device 110A receives a decision 162. This decision 162 indicates whether or not user request 102 is approved. Based on decision 162, user computing device 110A performs an action 118 for the request 102. For example, if user request 102 is a transaction request, decision 162 may indicate to authorize the transaction. In this example, action 118 includes processing the transaction request. In addition, user computing device 110A may send a notification to user 125 e.g., by displaying a message to the user via a user interface of device 110A. As another example, if user request 102 is a request to login to a user account, decision 162 indicates to grant user 120 access to their account. In this example, user computing device 110A may grant the user access to their account by displaying an account page to the user via a user interface.

In other situations, a user may open an application or a web browser on their device and navigate to an account login page (e.g., a PAYPAL login page). In such situations, the disclosed techniques may determine whether to provide this user access to their account without requiring this user to enter their account credentials. For example, prior to a user entering their username and password, the disclosed techniques may implement a trained machine learning model (e.g., device-trained model 130A) to determine the risk associated with granting the user access to their account without them entering their login credentials. If, according to the output of the trained machine learning model, the risk associated with granting access falls below a security threshold, the disclosed system will automatically grant the user access to their account. This process is referred to as ONE TOUCH in the PAYPAL context.

Server computer system 150, in the illustrated embodiment, receives risk score 132 for user request 102 from device-trained model 130A of user computing device 110A. System 150 executes decisioning module 160 to generate a decision 162 for request 102 based on risk score 132. For example, decisioning module 160 may include a plurality of rules and heuristics for different entities associated with requests, devices associated with requests, types of requests, locations, etc. Decisioning module 160 may receive information specifying the type of request 102 from user computing device 110A in addition to the obfuscated user data 116 (which includes information about the user and the user's device). Decisioning module 160 selects a set of rules and heuristics for request 102 based on one or more characteristics indicated in obfuscated user data 116.

As one specific example, a first user submitting a transaction request for a wrench from a hardware store using a debit card might be less risky than a second user submitting a transaction request for a diamond ring from a pawn shop using a credit card. In this specific example, decisioning module 160 might select rules and heuristics with a higher tolerance threshold for the first user's transaction than for the second user's transaction. Further in this specific example, the requests from the first user and the second user might have similar risk scores 132; however, decisioning module 160 approves the first request and rejects the second request based on the risk tolerance threshold for the first request being greater than the risk tolerance threshold for the second request. Said another way, small transactions at a trusted merchant (e.g., a hardware store) may less risky than larger transactions at an unknown merchant (e.g., a pawn shop). As another specific example, two transaction requests submitted within the same local network (e.g., at a particular hardware store) might be evaluated using different risk thresholds. For example, a first transaction request for power tools might be evaluated using a lower risk threshold than a transaction request for a set of nails. As yet another example, transactions submitted at different vendors located at the same shopping mall may be evaluated using different risk threshold.

In some embodiments, decisioning module 160 performs risk analysis differently for different entities submitting a request. For example, in the context of an electronic transaction between a customer and a merchant, the merchant may be able to assume a greater amount of risk than the customer. Further in this context, a mature merchant (e.g., one that has been completing transactions for years and at a large volume) may have more room for risk than a newer merchant, so decisioning module 160 evaluates transaction requests from these two merchants differently (e.g., using different sets of rules). As another example, person-to-person electronic transactions might be evaluated differently than person-to-merchant transactions. As yet another example, if a funding instrument (e.g., a credit card) is known to be suspicious, this might affect the evaluation performed by decisioning module 160. Still further, a gourmet coffee merchant might have a high profit margin and, therefore, is willing to evaluate transactions using a higher risk threshold (e.g., is willing to be more lenient with risk and may allow transactions associated with a moderate level of risk) while a merchant selling silver coins might have a low profit margin and, as such, evaluates transactions using a lower risk threshold (e.g., is not lenient with risk and denies slightly risky transactions).

In addition to generating decision 162, server computer system 150 receives device-trained models 130A-130N from user computing devices 110A-110N and performs additional training on these models. Before performing additional training, server computer system 150 evaluates the performance of various device-trained models 130 using similarity module 170 and performance module 180. Similarity module 170, in the illustrated embodiment, receives device-trained models 130A-130N from user computing devices 110 and determines similarity scores for models that have similar obfuscated user data 116. Similarity module 170 is discussed in further detail below with reference to FIG. 4.

Performance module 180, in the illustrated embodiment, determines, based on the similarity scores 172 generated by similarity module 170, one or more low-performance models 182. For example, performance module 180 determines that two models are similar based on their similarity score 172 and then compares the performance of these two models. In some embodiments, performance module 180 identifies low-performance models 182 based on these models performing more than a threshold amount differently than their identified similar counterparts. As one specific example, if a first model of two similar models is 90% accurate in its classifications and a second model is 70% accurate in its classifications, then performance module 180 identifies the second model as a low-performance model 182 based on this model performing more than 10% below the first model. Performance module 180 sends the identified low-performance model to training module 190 for additional training. Performance module 180 is discussed in further detail below with reference to FIG. 4.

Training module 190, in the illustrated embodiment, performs additional training on one or more low performance models 182 received from performance module 180. In some embodiments, training module 190 retrains device-trained model 130A using obfuscated user data 116 from a plurality of different user computing devices 110B-110N. For example, instead of device-trained model 130A being trained only on user data from user computing device 110A, server computer system 150 retrains model 130A using data from a plurality of different user computing devices 110. In other embodiments, training module 190 generates an aggregate model from a plurality of device-trained models 130. Training module 190 may repeat this retraining process for device-trained models 130A-130N received from user computing devices 110. Training performed by module 190 is discussed in further detail below with reference to FIG. 4. Server computer system 150, in the illustrated embodiment, transmits one or more updated models 192 to one or more of user computing devices 110.

As used herein, the term "baseline model" refers to a machine learning model that a given user computing device begins using without the model having been trained at the given user computing device previously. For example, a baseline model may have been trained previously at another user device or at the server computer system 150 and then downloaded by the given user computing device. The baseline model may be a machine learning model that is trained by system 150 to identify account takeovers (ATOS) completed by fraudulent users, for example. This type of baseline model may be referred to as an ATO model. As used herein, the term "device-trained model" refers to a machine learning model that has been trained to some extent at a user computing device using a stream of user data received at the user computing device. Device-trained model 130A is one example of this type of model. Device-trained models generally are maintained and executed on user computing devices (e.g., on edge devices) As used herein, the term "updated model" refers to a machine learning model that is generated at a server computer system from one or more device-trained models. For example, an updated model might be an aggregate of a plurality of device-trained models trained at different user computing devices. Alternatively, an updated model might be a single device-trained model that has been retrained in some way by server computer system 150.

In this disclosure, various "modules" operable to perform designated functions are shown in the figures and described in detail (e.g., decisioning module 160, similarity module 170, performance module 180, training module 190, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC.

Various disclosed examples are discussed herein with respect to identification of fraudulent behavior. Note, however, that the disclosed device-side machine learning techniques might be applied any of various situations. For example, the disclosed device-side machine learning may be implemented to personalize a user interface or user experience, or both, provide personalized recommendations, etc.

Example User Computing Device

Figure 2:
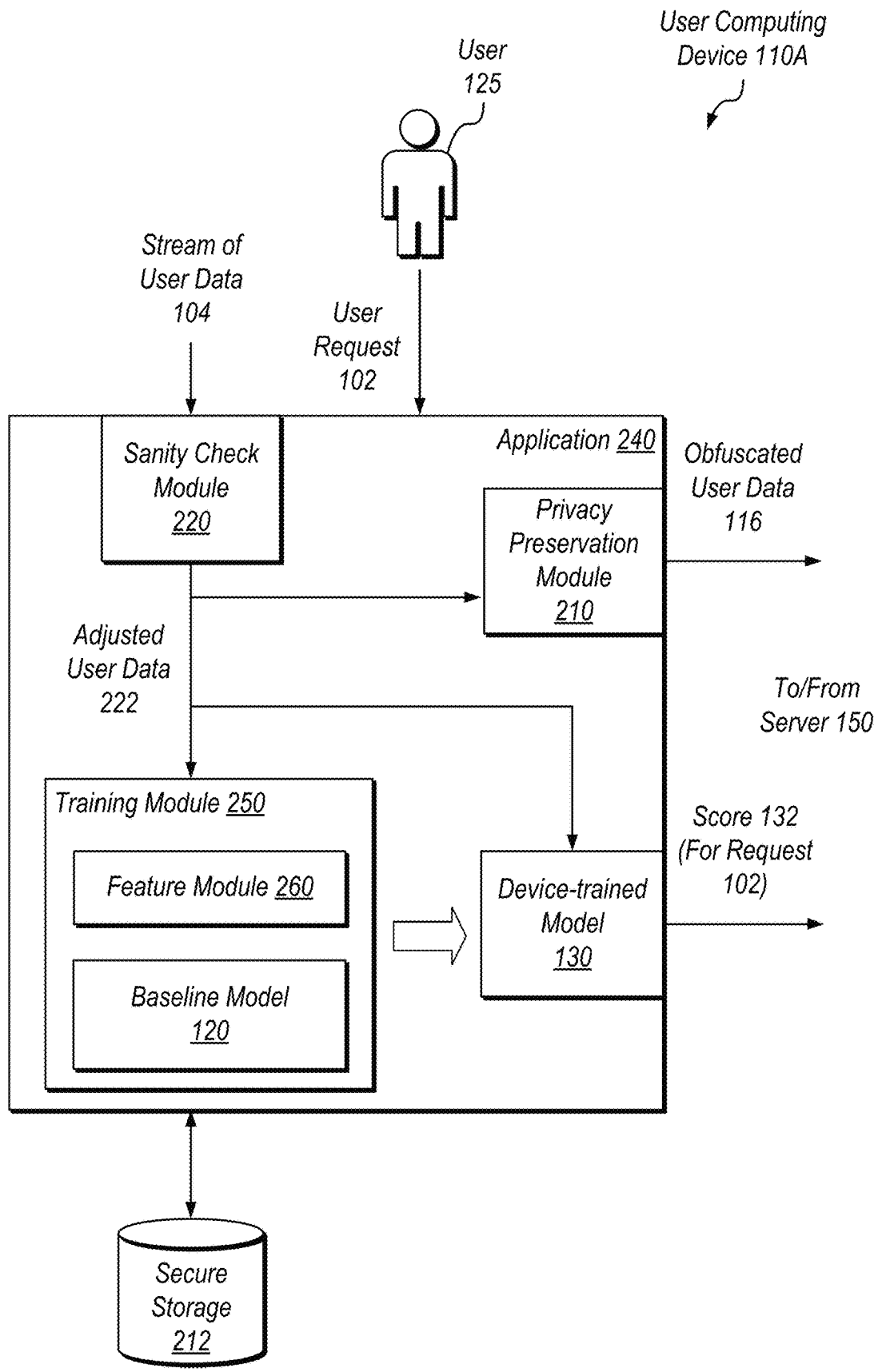
FIG. 2 is a block diagram illustrating an example user computing device, according to some embodiments.

Turning now to FIG. 2, a block diagram is shown illustrating an example user computing device 110A. In the illustrated embodiment, user computing device 110A includes secure storage 212 and application 240, which in turn includes sanity check module 220, privacy preservation module 210, training module 250, and updated model 130A.

Application 240, in the illustrated embodiment, receives user request 102 from user 125 and stream 104 of user data. In some embodiments, application 240 stores user data included in stream 104 in secure storage 212 such that other devices cannot access the user data. Secure storage 212 may be any of various types of storage such as those discussed below in further detail with reference to FIG. 7 (e.g., storage 712). For example, the stream 104 may include private user data that application 240 is not able to share with other computer systems due to user privacy measures implemented by the operating system of user computing device 110A prohibiting transmission of private user data off device. In some situations, stream 104 of user data include only a portion of the user data available to user computing device 110A. For example, application 240 may not have access to all of the user data available to user computing device 110A due security measures set in place on certain user computing devices. Application 240 may be downloaded onto user computing device 110A from an application store, for example, by user 125. In some embodiments, application 240 is associated with a transaction processing service. For example, application 240 may be a PAYPAL application facilitating online electronic transactions. In situations in which user computing device 110A is a mobile device, application 240 is a mobile application. When user computing device 110A is a desktop computer, for example, application 240 may be accessed via a web browser of the desktop computer.

Sanity check module 220 receives stream 104 of user data and determines whether this data follows an expected statistical summary. In some embodiments, sanity check module 220 remediates the impact of anomalies in the user data (e.g., originating from system issues such as timeouts, from the user request itself, etc.). For example, sanity check module 220 may compare a vector of incoming user data to statistical vectors generated using a statistics aggregator included in sanity check module 220. As one specific example, sanity check module 220 may compare an incoming vector of user data in a multivariate manner to statistical distance measures (e.g., Mahalanobis distance, Bhattacharya distance, Kullback-Leibler divergence metrics, etc.). The statistics aggregator may also perform a temporal assessment using multi-variate moving averages and splines. Such techniques may cap incoming user data by one or more deviations from the median vectors to which they are compared due to numerical values beyond a given capped coefficient lacking value when using the user data to train machine learning models. In some situations, sanity check module 220 leaves a portion of the incoming user data uncapped.

As one specific example, if the mean, median, etc. of the incoming user data align with the mean, median, etc. values of the statistical vectors, then the stream of user data is sent directly to training module 250 and privacy preservation module 210. For example, the statistics aggregator may select a snapshot of user data from 15 minutes prior to a current timestamp and compare this to user data included in the stream 104 and associated with the current timestamp. If the data form the current timestamp differs a threshold amount from user data in the snapshot from 15 minutes ago, then the sanity check module 220 adjusts the user data from the current timestamp. If, however, the values of incoming user data do not align with the statistical feature vectors, then sanity check module 220 alters the incoming data to generate adjusted user data 222. Adjusted user data 222 is then sent to privacy preservation module 210 for obfuscation and device-trained model 130 for predicting a risk score 132 for user request 102.

Training module 250, in the illustrated embodiment, includes feature module 260 and baseline model 120. Feature module 260 performs one or more feature engineering processes on the adjusted user data 222 prior to using this data to train baseline model 120. Feature engineering processes performed by feature module 260 are discussed in further detail below with reference to FIGS. 3A and 3B. Once feature module 260 generates pre-processed user data, training module 250 trains baseline model 120 using one or more machine learning techniques and the pre-processed data to generate device-trained model 130. In some embodiments, training module 250 repeatedly trains baseline model 120 as new user data is received. For example, training module 250 may train a baseline model 120 at a time t1 using a set of user data including data received prior to time t1 and then perform additional training on the baseline model 120 at time t2 using a set of user data including at least data received between time t1 and time t2. In this way, baseline model 120 may be updated as new user data is received at application 240.

Privacy preservation module 210, in the illustrated embodiment, receives adjusted user data 222 from sanity check module 220 and performs one or more privacy techniques on the data to generate obfuscated user data 116. The privacy techniques performed by privacy preservation module 210 include: differential privacy, homomorphic encryption, secure multi-party computation, etc. Differential privacy, for example, includes providing information about a set of data by describing patterns of groups within the set of data while withholding information about individuals in the set of data. Homomorphic encryption permits computations on encrypted data without first requiring that the data be decrypted. For example, results of performing computations on homomorphically encrypted data is identical to the output produced when such computations are performed on an unencrypted version of the data. Secure-multi-party computation allows multiple different entities to perform computations for their grouped data while maintaining the privacy of each individual entities data. For example, this cryptographic method protects the privacy of the different entities data from other entities whose data is included in the grouped data.

Example Feature Engineering

Figure 3A:
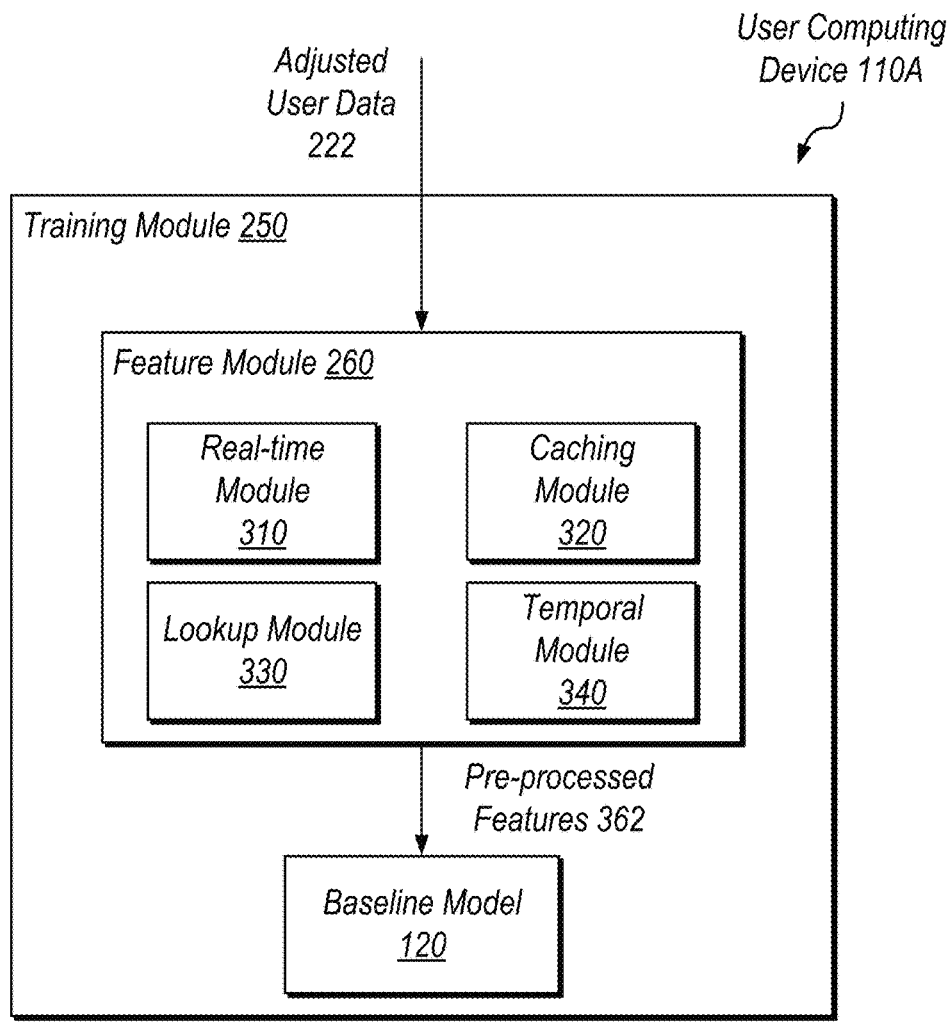
FIGS. 3A and 3B are diagrams illustrating example feature pre-processing, according to some embodiments.

As discussed above with reference to FIG. 2, user computing device 110A trains a model using machine learning techniques; however, prior to performing such training, the user computing device 110A may perform feature engineering on user data to be used for training. FIG. 3A is a block diagram illustrating an example training module 250. In FIG. 3A, user computing device 110A includes training module 250, which in turn includes feature module 260 and a baseline model 120. Feature module 260 in FIG. 3A includes real-time module 310, caching module 320, lookup module 330, and temporal module 340.

Feature module 260, in the illustrated embodiment, receives adjusted user data 222 and generates pre-processed features 362. Feature module 260 generates pre-processed features 362 using one or more pre-processing techniques. For example, feature module 260 may execute one or more of real-time module 310, caching module 320, lookup module 330, and temporal module 340 to generate pre-processed features 362. Example pre-processing techniques that may be implemented by one or more of modules 310-340 include descaling, weight-of-evidence, mid-max scalar, edge detection, etc. In some embodiments, when executing one or more of modules 310-340, feature module 260 implements at least two different pre-processing techniques. For example, when the adjusted user data 222 includes both continuous and categorical features, feature module 260 may implement both descaling and weight-of-evidence techniques. In some embodiments, training module 250 uses pre-processed features 362, generated by feature module 260, to generate a directed acyclic graph (DAG). In some embodiments, training module 250 uses the DAG to train baseline model 120.

In some embodiments, pre-processed features 362 are included in a vector of features for a given user request. In some embodiments, these vectors of features are included in a feature matrix generated for a plurality of user requests received at a given user computing device. For example, a matrix of feature vectors might include feature vectors for user requests received at user computing device 110A within the past 24 hours.

Real-time module 310 performs on-the-fly data processing. Said another way, real-time module 310 pre-processes adjusted user data 222 as it is received. For example, as new user requests 102 are received at user computing device 110A and as new data comes in from the stream 104 of user data, real-time module 310 performs pre-processing techniques.

Caching module 320 receives adjusted user data 222 and stores this data in a cache until a threshold number of characteristics are received in user data 222 and stored in the cache. For example, the threshold may specify a number of unique characteristics (e.g., one account number, one email address, one location, one device ID, etc.), a total number of characteristics including repeats, a total number of values for a given variable, a total amount of time, etc. Once the threshold number of characteristics is satisfied, caching module 320 performs one or more feature pre-processing techniques on the data stored in the cache. As one specific example, caching module 320 may store 100 different characteristics included in user data 222 in a cache before performing feature transformations on these characteristics. In this specific example, the threshold number of characteristics is 99. As another specific example, caching module 320 may perform pre-processing on data values stored in a cache after a predetermined time interval. For example, caching module 320 may perform pre-processing techniques on data stored in a cache every five minutes. In some embodiments, caching module 320 stores features generated by performing preprocessing on the characteristics included in user data 222 in the cache.

The cache utilized by caching module 320 may be an AEROSPIKE cache, for example. The cache utilized by caching module 320 may be a key-value store. After performing one or more feature pre-processing techniques on the values of the given feature, caching module 320 may store this pre-processed feature in the key-value store cache. For example, caching module 320 may store the data value for a given variable as the key and store the preprocessed feature for the given variable as the value in the key-value store.

Lookup module 330 performs a lookup for training module 250 as adjusted user data 222 is received. For example, based on receiving a particular piece of user data, lookup module 330 checks, in a key-value store (such as the store implemented by caching module 320), whether this piece of data matches a key in the key-value store. If the piece of data does match a key, lookup module 330 retrieves the value corresponding to this key and returns it to feature module 260 as a pre-processed feature 362. For example, the keys of the key-value store include raw user data, while the values of the key-value store include user data that has already been pre-processed in some way.

Temporal module 340 generates a matrix of feature vectors that includes feature vectors generated using adjusted user data 222 from different intervals of time. For example, the matrix of feature vectors may include data from the past 24 hours, past 15 minutes, past 15 seconds, etc. As one specific example, if the matrix of feature vectors includes data from the past 24 hours, then the matrix may include 96 different feature vectors with user data from different 15-minute time intervals. As new adjusted user data 222 is received at feature module 260, temporal module 340 updates the matrix of feature vectors e.g., by implementing a first-in/first-out method. In this way, temporal module 340 maintains a matrix by continuously refreshing the matrix as new user data is received.

Figure 3B:
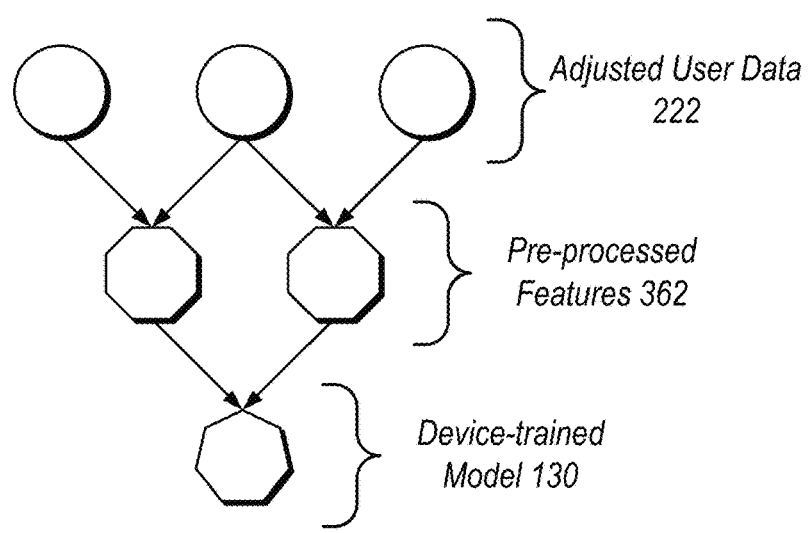

Turning now to FIG. 3B, a diagram is shown illustrating the example flow from adjusted user data to the generation of a device-trained model 130. For example, the adjusted user data 222 received by training module 250 as shown in FIG. 3B may include a plurality of different characteristics included in user data collected by user computing device 110A (e.g., from the stream 104 of user data shown in FIG. 1). In FIG. 3B, the plurality of different characteristics are pre-processed (by training module 250) to generate vectors of pre-processed features 362. Then, in FIG. 3B, the vectors of pre-processed features 362 are used (by training model 250) to train baseline model 120 using machine learning techniques to generate device-trained model 130.

Example Server Computer System

Figure 4:
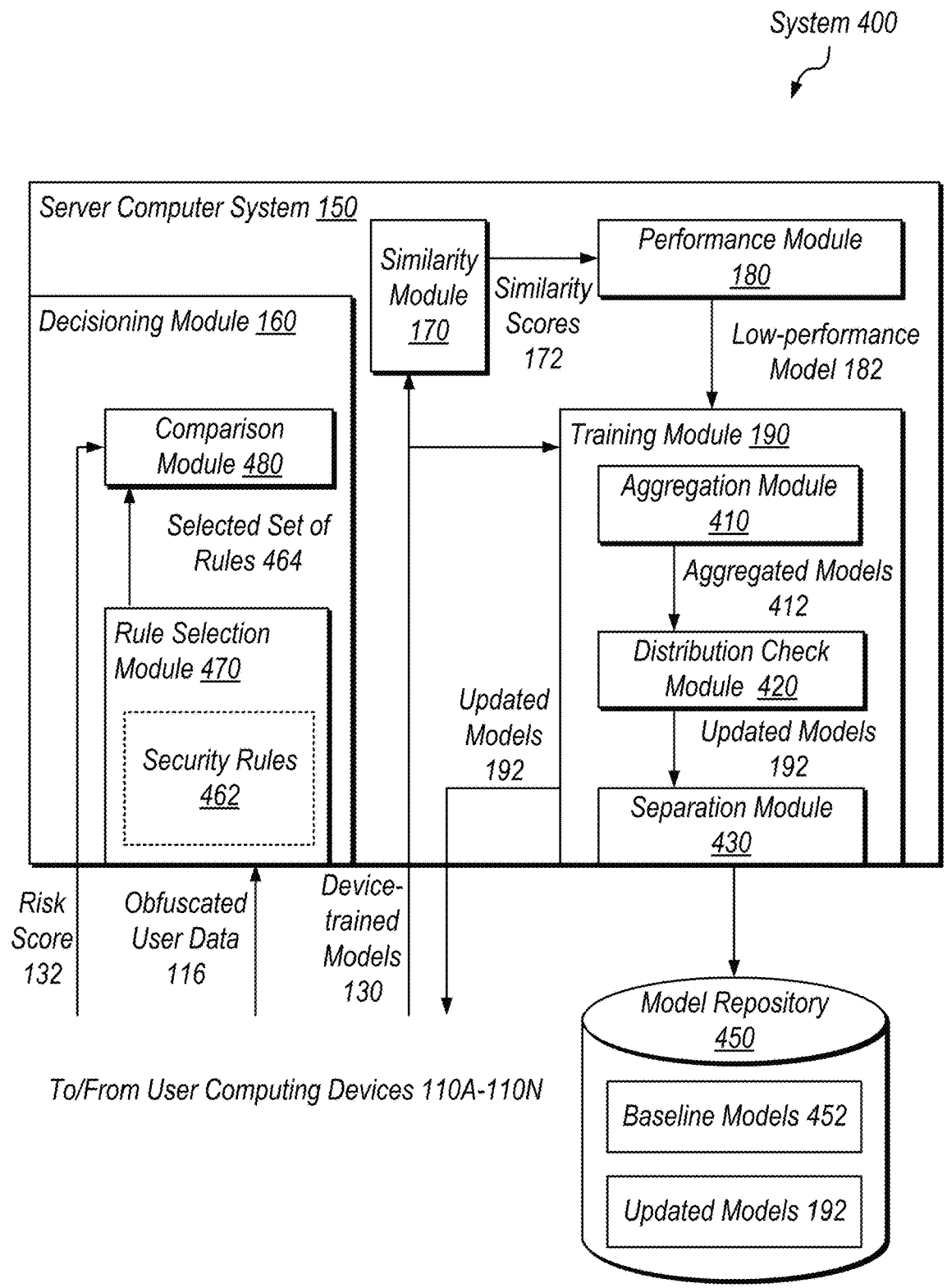
FIG. 4 is a block diagram illustrating an example server computer system, according to some embodiments.

Turning now to FIG. 4, a block diagram is shown illustrating an example server computer system 150. In the illustrated embodiment, system 400 includes a model repository 450 and server computer system 150, which in turn includes decisioning module 160, similarity module 170, performance module 180, and training module 190. The training discussed with reference to FIG. 4 is performed by server computer system 150 to ensure that models trained at user computing devices 110 are satisfying a performance threshold since these models are primarily trained at the user devices on user data available at the given device. In this way, server computer system 150 is able to provide checks and balances to ensure that models trained at user computing devices have not become skewed in some way.

Decisioning module 160, in the illustrated embodiment, includes rule selection module 470 and comparison module 480. Rule selection module 470 receives obfuscated user data 116 from user computing devices 110A-110N and selects a set 464 of rules from a plurality of security rules 462 (e.g., for evaluating user request 102) based on the obfuscated user data 116. In some embodiments, rule selection module 470 receives a portion of user data that is not obfuscated. As such, rule selection module 470 may select a set 464 of rules for evaluating user request 102 based on the user data that has not been obfuscated or user data that has been obfuscated, or both. These rules may include any of various types of rules including service-level agreements, risk thresholds, etc.

Rule selection module 470 then passes the selected set 464 of rules to comparison module 480. In some situations, decisioning module 160 makes a decision for user request 102 by both comparing the risk score to a risk threshold and also comparing a non-obfuscated characteristic to a characteristic threshold. If one or both of the risk score and non-obfuscated characteristic satisfy their respective thresholds, then decisioning module 160 may send instructions to the user computing device specifying to require further user authentication. For example, if a transaction amount (an example characteristic) is greater than a certain amount (a transaction amount threshold), then decisioning module 160 may request further authentication prior to authorizing the transaction.

In other embodiments, decisioning module 160 implements a risk threshold for a plurality of different user computing devices. For example, decisioning module 160 may compare a risk score from a user computing device with the risk threshold without receiving user data (obfuscated or not) and without selecting a set of rules for this user computing device. In this example, if the risk score satisfies the risk threshold, then decisioning module 160 sends instructions to the user computing device to require a user of the device to complete further authentication checks. In still other embodiments, user computing devices may include a decisioning module that makes on-device risk decisions based on risk scores output by device-trained models.

Comparison module 480 compares risk score 132 (received from user computing devices 110A-110N) with the selected set 464 of rules. For example, comparison module 480 may compare the risk score 132 to a risk threshold included in the selected set 464 of rules. Based on the comparison performed by comparison module 480, decisioning module 160 outputs a decision 162 for the user request 102 as shown in FIG. 1. As one specific example, if the risk score for a given user request is 0.8 and the risk threshold is 0.6, then comparison module 480 may output a decision 162 indicating that the given user request is rejected (i.e., based on the risk score of 0.8 surpassing the risk threshold of 0.6 for this request).

In addition to providing decisions for different user requests based on risk scores 132 produced at user computing devices 110, server computer system 150 provides checks and balances for device-trained models 130. In this way, server computer system 150 advantageously identifies and corrects any unbalanced training of device-trained models 130 by comparing these models trained at similar user devices with one another. In particular, similarity module 170, in the illustrated embodiment, receives device-trained models 130 from user computing devices 110. Similarity module 170 determines similarity scores for two or more models 130 that are nearest neighbors. For example, similarity module 170 determines if two or more models are trained using similar sets 114 of user data (shown in and discussed above with reference to FIG. 1) based on observing obfuscated user data 116 received from user computing devices 110 that trained these similar models. As one specific example, if two devices are capturing similar user activity and training their respective models based on this similar activity, their models should be performing with similar accuracy. If, however, one of these models is performing less accurately than the other, server computer system 150 flags this model for retraining.

Similarity module 170 applies a clustering algorithm (e.g., a k-nearest neighbor algorithm, semi-supervised machine learning algorithm, etc.) on obfuscated user data 116 received from different user computing devices 110. Based on the output of the clustering algorithm, similarity module 170 identifies a statistical neighborhood of devices running a set of models that are similar (e.g., one or multiple of which may be used as a head-starter model for a new user computing device). Then, performance module 180 takes two or more similar models identified by similarity module 170 and determines their performance. For example, performance module 180 may determine that a first model is 90% accurate (e.g., 90% of the classifications output by the first model are correct), while a second model is 80% accurate (e.g., 80% of the classifications output by the second model are correct). Performance module 180 then compares the performance of these models (e.g., by comparing individual classifications output by these models or by comparing the overall performance of these models, or both). If at least one of the models is performing poorly compared to its nearest neighbor models, for example, then performance module 180 flags this model as a low-performance model 182 and sends this model to training module 190 for additional training.

In some embodiments, instead of retraining the low-performance model 182, training module 190 replaces the low-performance model 182 with one of the similar models determined by similarity module 170. For example, the first model discussed above that is 90% accurate may be used by training module 190 to replace the second model that is 80% accurate. That is, training module 190 may transmit the second model to the user computing device 110 who trained the second, 80% accurate model. In this example, the replacement model that is 90% accurate is one of the "updated model 192" shown in FIG. 4 that is sent from training module 190 to user computing devices 110. In other embodiments, training module 190 executes distribution check module 420 and aggregation module 410 to generate updates models 192 to replace low-performance models 182 identified by performance module 180.

Aggregation module 410 performs one or more ensemble techniques to combine two or more device-trained models 130 to generate aggregated models 412. For example, aggregation module 410 takes the coefficients of two or more device-trained models 130 and combines them using one or more ensemble techniques, such as logistic regression, federated averaging, gradient descent, etc. Aggregation module 410, in the illustrated embodiment, sends one or more aggregated models 412 to distribution check module 420.

In some embodiments, aggregation module 410 aggregates two or more head-starter models. For example, aggregation module 410 may aggregate a model that is trained at server computer system 150 based on account takeover data, known fraudulent behavior (e.g., fraudulent transactions), etc. As one specific example, aggregation module 410 may aggregate a model trained on account takeover data and a model trained on fraudulent transaction data to generate an aggregated head-starter model. In some embodiments, training module 190 sends an aggregated head-starter model to one or more of user computing devices 110. As one specific example, training module 190 may train a head-starter model based on data from the past week, month, year etc. Training module 190 then sends this model to a user computing device 110 that has had an application associated with server computer system 150 downloaded for a week, month, year, etc. The application associated with server computer system 150 may be an application downloaded on a user computing device such that it is operable to communicate with server computer system 150 to process user requests, such as transactions. In some situations, user computing devices 110 that are highly active (e.g., process a threshold number of user requests) send their device-trained models 130 to server computer system 150 for fine-tuning more often than user computing devices 110 that are not highly active (e.g., process a number of user requests below the threshold number of requests). For example, highly active devices 110 may send their models in for fine-tuning once a week, while other devices 110 only send their models in once a month for fine-tuning.

In some embodiments, distribution check module 420 checks whether aggregated models 412 are meeting a performance threshold. If, for example, an aggregated model is not meeting a performance threshold, distribution check module 420 may perform additional training of this model using obfuscated user data 116 from a plurality of different user computing devices 110. For example, distribution check module 420 uses obfuscated user data 116 to fine-tune the training of aggregated models 412 prior to sending these updated models 192 to user computing devices (or storing them in model repository 450, or both).

Separation module 430, in the illustrated embodiment, sorts and stores various models generated by training module 190 in model repository 450. For example, separation module 430 sorts updated models 192 or baseline models 452, or both based on various characteristics. Such characteristics may include the obfuscated user data 116 used to train this model (e.g., domain information, geographic location, etc.), one or more device-trained models 130 used to generate an updated model 192, etc. Training module 190, in the illustrated embodiment, stores baseline models 452 and updated models 192 according to the sorting performed by separation module 430. Such sorting and storage may advantageously allow server computer system 150 to quickly retrieve an appropriate model for a given user computing device 110 to replace a current, low-performance model 182 used by the given device 110. In the illustrated embodiment, training module 190 retrieves one or more updated models 192 from model repository 450 and sends these models 192 to one or more user computing devices 110.

Example Methods

FIG. 5 is a flow diagram illustrating a method 500 for training a machine learning model using embedded transaction data, according to some embodiments. The method shown in FIG. 5 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In some embodiments, one or more of user computing device 110 perform the elements of method 500.

At 510, in the illustrated embodiment, a computing device repeatedly trains, using a stream of user data received at the computing device, a baseline model to generate a device-trained model, where the baseline model is trained at the computing device without providing user data included in the stream to a server computer system. In some embodiments, the stream of user data includes a plurality of characteristics associated with the computing device and the set of characteristics associated with the user request. For example, the stream of user data may include information about a user that needs to be kept private (e.g., banking information, social security number, physical address, etc.). In some embodiments, the baseline model and the device-trained model are machine learning models. In some embodiments, prior to repeatedly training the baseline model, the computing device receives, from the server computer system, the baseline model, where the baseline model is trained by the server computer system without the stream of user data securely stored at the computing device.

For example, the baseline model may be a simple model trained at the server computer system and then sent to the computing device for device-specific training using private user data.

In some embodiments, the repeatedly training includes generating an aggregated depiction of data included in the stream of user data. In some embodiments, the repeatedly training includes generating an aggregated depiction of data included in the stream of user data. In some embodiments, the repeatedly training includes adjusting the stream of user data based on one or more portions having data that differ a threshold amount. For example, the computing device may compare new feature vectors (generated from the stream of user data) of different transactions based on their timestamps to determine whether these feature vectors are following the known aggregated depiction of feature vectors. As one specific example, the computing device determines whether a current transaction has similar features to a transaction requested fifteen minutes ago.

In some embodiments, the repeatedly training includes performing one or more feature engineering techniques on a plurality of characteristics included in the stream of user data, where the one or more feature engineering techniques are performed according to one or more conditions of the following conditions: on-the-fly processing, lookup-based processing, and cache-based processing. For example, the featuring engineering techniques may include pre-processing the plurality of characteristics included in the stream of user data using one or more pre-processing techniques discussed above with reference to FIG. 3A.

At 520, the computing device inputs, to the device-trained model, a set of characteristics associated with a user request received from a user of the computing device, where the device-trained model outputs a score for the user request. In some embodiments, the user request received from the user of the computing device is a request to initiate a transaction, where the decision for the user request is an authorization decision for the transaction. In some embodiments, the user request received from the user of the user computing device is an authentication request to authenticate the user of the user computing device to a user account, where the decision for the user request is an authentication decision.

At 530, the computing device transmits, to the server computer system, the score for the user request, where the transmitting includes requesting a decision for the user request. In some embodiments, the computing device obfuscates, using one or more privacy techniques, a portion of the user data. In some embodiments, the computing device transmits, to the server computer system, the obfuscated portion of the user data. In some embodiments, the one or more privacy techniques include one or more of the following techniques: differential privacy, homomorphic encryption, and secure multi-party computation.

At 540, the computing device performs an action associated with the user request in response to receiving a decision for the user request from the server computer system. In some embodiments, performing the action includes automatically granting the user of the user computing device access to an account associated with the server computer system, wherein the automatically granting is performed without requiring credentials from the user.

FIG. 6 is a flow diagram illustrating a method 600 for training a machine learning model using embedded transaction data, according to some embodiments. The method shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In some embodiments, server computer system 150 performs the elements of method 600.

At 610, in the illustrated embodiment, a server computer system receives from a plurality of user computing devices, a plurality of device-trained models and obfuscated sets of user data stored at the plurality of user computing devices, where the device-trained models are trained at respective ones of the plurality of user computing devices using respective sets of user data prior to obfuscation. In some embodiments, the user computing devices are mobile devices.

At 620, the server computer system determines similarity scores for the plurality of device-trained models, where the similarity scores are determined based on a performance of the device-trained models. In some embodiments, determining similarity scores for the plurality of device-trained models is performed based on determining, using a machine learning algorithm, two or more of the plurality of user computing devices that are similar, where the determining is performed based on characteristics specified in the obfuscated sets of user data. As one specific example, similar user computing devices are ones with at least 80% of the same user data. In some embodiments, determining similarity scores for the plurality of device-trained models is performed based on selecting, based on the two or more user computing devices that are similar, device-trained models corresponding to the two or more user computing devices that are similar. For example, the server computer system may use a k-nearest neighbor algorithm to identify nearest neighbor user computing devices in order to use models trained by the devices to provide models for new user computing devices or replace models executed by existing user computing devices, or both.

At 630, the server computer system identifies, based on the similarity scores, at least one of the plurality of device-trained models as a low-performance model. For example, the server computer system may determine that one device-trained model is performing above a performance threshold, while another device-trained model is performing below the performance threshold.

At 640, the server computer system transmits, to the user computing device corresponding to the low-performance model, an updated model. In some embodiments, the server computer system generates, prior to the transmitting, the updated model. In some embodiments, generating the updated model includes generating an aggregated model by combining two or more of the plurality of updated models received from the plurality of user computing devices. In some embodiments, generating the updated model further includes inputting the obfuscated set of user data received from the low-performance model into the aggregated model. In some embodiments, the server computer system stores the updated model in a database based on domain information and geographic region information.

In some embodiments, the server computer system receives, from one of the plurality of user computing devices, a risk score for a user request received at the user computing device, where the risk score is generated by the user computing device using a device-trained model. In some embodiments, the server computer system determines, based on a plurality of rules associated with the user request, a decision for the user request. In some embodiments, the server computer system transmits, to the user computing device, the decision for the user request. For example, the server computer system includes various rules and heuristics for different devices, user request, etc. and uses these rules and heuristics to provide decisions to user computing devices for the different user requests. In some embodiments, the plurality of rules associated with the user request are selected based on one or more characteristics of the following types of characteristics: a location of the user computing device, a type of user request received at the user computing device, and one or more entities indicated in the user request.

In some embodiments, the server computer system receives, from a new user computing device that has newly downloaded an application of the server computer system, a request for a baseline model. In some embodiments, the baseline model is an untrained model. In some embodiments, the user computing device generates the device-trained model from scratch. For example, the user device may train a model from scratch instead of requesting a baseline model from the server computer system. In some embodiments, the server computer system selects, from the database, an updated model, where the selecting is performed based on one or more obfuscated sets of user data received from the new user computing device. In some embodiments, the server computer system transmits, to the new user computing device, the selected updated model.

In some embodiments, one of the plurality of device-trained models is trained at a given user computing device by comparing different portions of an aggregated depiction of a stream of non-obfuscated user data gathered at the given user computing device. In some embodiments, the one device-trained model is further trained by adjusting the stream of non-obfuscated user data based on or more portions having data differing a threshold amount. In some embodiments, the one device-trained model is further trained by inputting the adjusted steam of non-obfuscated user data into a baseline model to generate the one device-trained model.

Example Computing Device

Figure 7:
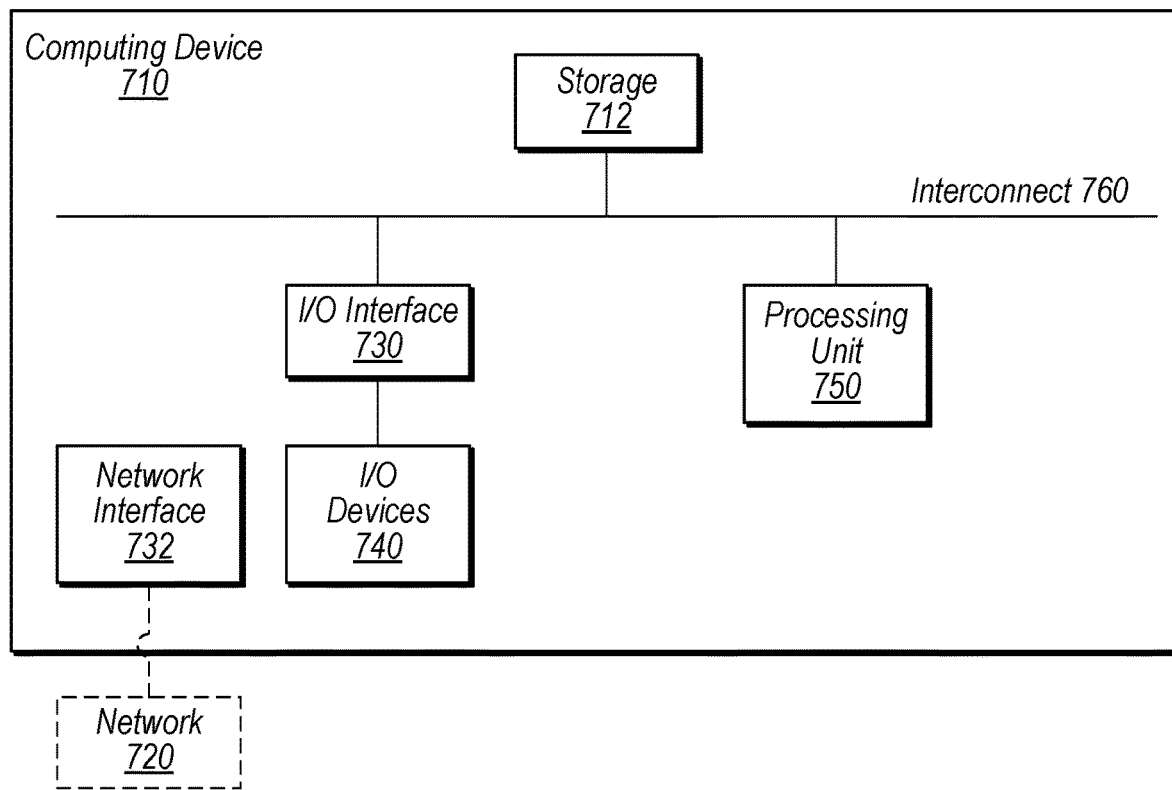
FIG. 7 is a block diagram illustrating an example computing device, according to some embodiments.

Turning now to FIG. 7, a block diagram of one embodiment of computing device (which may also be referred to as a computing system) 710 is depicted. Computing device 710 may be used to implement various portions of this disclosure. Computing device 710 may be any suitable type of device, including, but not limited to, a personal computer system, desktop computer, laptop or notebook computer, mainframe computer system, web server, workstation, or network computer. The user computing device 110 shown in FIG. 1 and discussed above is one example of computing device 710. As shown, computing device 710 includes processing unit 750, storage 712, and input/output (I/O) interface 730 coupled via an interconnect 760 (e.g., a system bus). I/O interface 730 may be coupled to one or more I/O devices 740. Computing device 710 further includes network interface 732, which may be coupled to network 720 for communications with, for example, other computing devices.

In various embodiments, processing unit 750 includes one or more processors. In some embodiments, processing unit 750 includes one or more coprocessor units. In some embodiments, multiple instances of processing unit 750 may be coupled to interconnect 760. Processing unit 750 (or each processor within 750) may contain a cache or other form of on-board memory. In some embodiments, processing unit 750 may be implemented as a general-purpose processing unit, and in other embodiments it may be implemented as a special purpose processing unit (e.g., an ASIC). In general, computing device 710 is not limited to any particular type of processing unit or processor subsystem.

Storage subsystem 712 is usable by processing unit 750 (e.g., to store instructions executable by and data used by processing unit 750). Storage subsystem 712 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 712 may consist solely of volatile memory, in one embodiment. Secure storage 212 discussed above with reference to FIG. 2 is one example of storage subsystem 712. Storage subsystem 712 may store program instructions executable by computing device 710 using processing unit 750, including program instructions executable to cause computing device 710 to implement the various techniques disclosed herein.

I/O interface 730 may represent one or more interfaces and may be any of various types of interfaces configured to couple to and communicate with other devices, according to various embodiments. In one embodiment, I/O interface 730 is a bridge chip from a front-side to one or more back-side buses. I/O interface 730 may be coupled to one or more I/O devices 740 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Further-more, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:
receiving, by a server computer system from a plurality of user computing devices, a plurality of device-trained models and obfuscated sets of user data stored at the plurality of user computing devices, wherein the device-trained models are trained at respective ones of the plurality of user computing devices using respective sets of user data prior to obfuscation;
determining, by the server computer system using a machine learning algorithm and based on characteristics specified in the obfuscated sets of user data, similarity scores for the plurality of device-trained models, wherein the similarity scores indicate a similarity between two or more of the plurality of device-trained models;
executing, by the server computer system based on the similarity scores indicating that two or more of the plurality of device-trained models are similar, the two or more device-trained models to generate risk scores for the obfuscated sets of user data;
identifying, by the server computer system based on the risk scores output by the two or more device-trained models, one of the two or more device-trained models as a low-performance model relative to the two or more device-trained models;
in response to identifying the low-performance model, transmitting, by the server computer system to a particular user computing device corresponding to the low-performance model, an updated model to replace the low-performance model at the particular user computing device; and
receiving, from the particular user computing device, a risk score generated using the updated model for a user request received at the particular user computing device.

2. The method of claim 1, wherein the particular user computing device is a first user computing device, wherein the risk score received from the particular user computing device is a first risk score, and wherein the method further comprises:
receiving, by the server computer system, from a second user computing device of the plurality of user computing devices, a second risk score for a user request received at the second user computing device, wherein the second risk score is generated by the second user computing device using a device-trained model of the plurality of device-trained models; and
determining, by the server computer system based on a plurality of rules associated with the user request, a decision for the user request; and
transmitting, by the server computer system to the second user computing device, the decision for the user request.

3. The method of claim 2, wherein the plurality of rules associated with the user request are selected based on one or more characteristics of the following types of characteristics: a location of the user computing device, a type of user request received at the user computing device, and one or more entities indicated in the user request.

4. The method of claim 1, further comprising:
generating, by the server computer system prior to the transmitting, the updated model, wherein generating the updated model includes generating an aggregated model by combining two or more of the plurality of device-trained models received from the plurality of user computing devices.

5. The method of claim 4, wherein generating the updated model further includes:
inputting the obfuscated set of user data received from a user computing device corresponding to the low-performance model into the aggregated model.

6. The method of claim 1, wherein the machine learning algorithm is a clustering algorithm, and wherein the executing is performed based on:
identifying, based on the similarity scores, that the two or more device-trained models are nearest neighbors.

7. The method of claim 1, further comprising:
storing, by the server computer system in a database based on domain information and geographic region information, the updated model.

8. The method of claim 7, further comprising:
receiving, by the server computer system from a new user computing device that newly downloaded an application of the server computer system, a request for a machine learning model;
selecting, by the server computer system from the database, an updated model, wherein the selecting is performed based on searching the database according to one or more characteristics in an obfuscated set of user data received from the new user computing device; and
transmitting, by the server computer system to the new user computing device, the selected updated model.

9. A non-transitory computer-readable medium having instructions stored thereon that are executable by a server computer system to perform operations comprising:

receiving, from a plurality of user computing devices, a plurality of device-trained models and obfuscated sets of user data stored at the plurality of user computing devices, wherein the device-trained models are trained at respective ones of the plurality of user computing devices using respective sets of user data prior to obfuscation;

determining, using a clustering algorithm and based on characteristics specified in the obfuscated sets of user data, similarity scores for the plurality of device-trained models, wherein the similarity scores indicate a similarity between two or more of the plurality of device-trained models;

executing, based on the similarity scores indicating that two or more of the plurality of device-trained models are similar, the two or more device-trained models to generate risk scores for the obfuscated sets of user data;

identifying, based on the risk scores output by the two or more device-trained models, one of the two or more device-trained models as a low-performance model relative to the two or more device-trained models;

in response to identifying the low-performance model, transmitting to a particular user computing device corresponding to the low-performance model, an updated model to replace the low-performance model at the particular user computing device; and receiving, from the particular user computing device, a risk score generated using the updated model for a user request received at the particular user computing device.

10. The non-transitory computer-readable medium of claim 9, wherein the particular user computing device is a first user computing device, wherein the risk score received from the particular user computing device is a first risk score, and wherein the operations further comprise:

receiving, from a second user computing device of the plurality of user computing devices, a second risk score for a user request received at the second user computing device, wherein the second risk score is generated by the second user computing device using a device-trained model; and determining, based on a plurality of rules associated with the user request, a decision for the user request; and transmitting, to the second user computing device, the decision for the user request.

11. The non-transitory computer-readable medium of claim 10, wherein the plurality of rules associated with the user request are selected based on one or more characteristics of the following types of characteristics: a location of the second user computing device, a type of user request received at the second user computing device, and one or more entities indicated in the user request.

12. The non-transitory computer-readable medium of claim 9, wherein one of the plurality of device-trained models is trained at a given user computing device by:

comparing different portions of an aggregated depiction of a stream of non-obfuscated user data gathered at the given user computing device;

adjusting the stream of non-obfuscated user data based on one or more portions having data differing a threshold amount; and inputting the adjusted stream of non-obfuscated user data into a baseline model to generate the one device-trained model.

13. The non-transitory computer-readable medium of claim 9, wherein the operations further comprise:

generating, prior to the transmitting, the updated model, wherein generating the updated model includes generating an aggregated model by combining two or more of the plurality of device-trained models received from the plurality of user computing devices.

14. The non-transitory computer-readable medium of claim 13, wherein generating the updated model further includes:

inputting the obfuscated set of user data received from the particular user computing device corresponding to the low-performance model into the aggregated model.

15. The non-transitory computer-readable medium of claim 9, wherein the executing is performed based on:

identifying, based on the similarity scores, that the two or more device-trained models are nearest neighbors.

16. A system, comprising:

at least one processor; and a memory having instructions stored thereon that are executable by the at least one processor to cause the system to:

receive, from a plurality of user computing devices, a plurality of device-trained models and obfuscated sets of user data stored at the plurality of user computing devices, wherein the trained models are trained at respective ones of the plurality of user computing devices using respective sets of user data prior to obfuscation;

determine, using a machine learning algorithm and based on characteristics specified in the obfuscated sets of user data, similarity scores for the plurality of device-trained models, wherein the similarity scores indicate a similarity between two or more of the plurality of device-trained models;

execute, based on the similarity scores indicating that two or more of the plurality of device-trained models are similar, the two or more device-trained models to generate risk scores for the obfuscated sets of user data;

identify, based on the risk scores output by the two or more device-trained models, one of the two or more device-trained models as a low-performance model relative to the two or more device-trained models;

transmit, to a particular user computing device corresponding to the low-performance model based on identifying the low-performance model, an updated model to replace the low-performance model at the particular user computing device; and receive, from the particular user computing device, a risk score generated using the updated model for a user request received at the particular user computing device.

17. The system of claim 16, wherein the particular user computing device is a first user computing device, wherein the risk score received from the particular user computing device is a first risk score, and wherein the instructions are further executable by the at least one processor to cause the system to:

receive, from a second user computing device of the plurality of user computing devices, a second risk score for a user request received at the second user computing device, wherein the second risk score is generated by the second user computing device using a device-trained model of the plurality of device-trained models; and determine, based on a plurality of rules associated with the user request, a decision for the user request; and transmit, to the second user computing device, the decision for the user request.

18. The system of claim 17, wherein the plurality of rules associated with the user request are selected based on one or more characteristics included in the obfuscated set of user data received from the second user computing device.

19. The system of claim 16, wherein the instructions are further executable by the at least one processor to cause the system to:
generate, prior to the transmitting, the updated model, wherein generating the updated model includes generating an aggregated model by combining two or more of the plurality of device-trained models received from the plurality of user computing devices.

20. The system of claim 16, wherein the machine learning algorithm is a clustering algorithm, and wherein the executing is performed based on:
identifying, based on the similarity scores, that the two or more device-trained models are nearest neighbors.

* * * * *